US008533203B2

(12) United States Patent
Chaudhuri et al.

(10) Patent No.: US 8,533,203 B2
(45) Date of Patent: Sep. 10, 2013

(54) IDENTIFYING SYNONYMS OF ENTITIES USING A DOCUMENT COLLECTION

(75) Inventors: Surajit Chaudhuri, Redmond, WA (US); Venkatesh Ganti, Redmond, WA (US); Dong Xin, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 617 days.

(21) Appl. No.: 12/478,120

(22) Filed: Jun. 4, 2009

(65) Prior Publication Data

US 2010/0313258 A1    Dec. 9, 2010

(51) Int. Cl.
*G06F 17/30* (2006.01)
*G06F 7/00* (2006.01)

(52) U.S. Cl.
USPC .......................................... 707/749; 707/728

(58) Field of Classification Search
None
See application file for complete search history.

(56) References Cited

U.S. PATENT DOCUMENTS

| | | | |
|---|---|---|---|
| 5,297,039 A | | 3/1994 | Kanaegami et al. |
| 5,418,948 A * | | 5/1995 | Turtle ........................... 707/700 |
| 5,469,355 A | | 11/1995 | Tsuzuki |
| 5,717,913 A | | 2/1998 | Driscoll |
| 6,098,034 A * | | 8/2000 | Razin et al. ....................... 704/9 |
| 6,137,911 A * | | 10/2000 | Zhilyaev ........................ 382/225 |
| 6,363,377 B1 | | 3/2002 | Kravets et al. |
| 6,370,527 B1 | | 4/2002 | Singhal |
| 6,377,945 B1 | | 4/2002 | Risvik |
| 7,080,068 B2 | | 7/2006 | Leitermann |
| 7,296,011 B2 | | 11/2007 | Chaudhuri et al. |
| 7,636,714 B1 * | | 12/2009 | Lamping et al. ..................... 1/1 |
| 7,860,853 B2 * | | 12/2010 | Ren et al. ...................... 707/706 |
| 7,890,521 B1 * | | 2/2011 | Grushetskyy et al. ........ 707/755 |
| 2002/0169755 A1 | | 11/2002 | Framroze et al. |
| 2005/0060312 A1 | | 3/2005 | Curtiss et al. |
| 2005/0060337 A1 | | 3/2005 | Chou et al. |
| 2005/0060643 A1 * | | 3/2005 | Glass et al. ................. 715/501.1 |
| 2005/0080613 A1 * | | 4/2005 | Colledge et al. ................... 704/9 |
| 2005/0086592 A1 * | | 4/2005 | Polanyi et al. ................ 715/512 |
| 2005/0149494 A1 * | | 7/2005 | Lindh et al. ....................... 707/3 |
| 2005/0216443 A1 * | | 9/2005 | Morton et al. .................... 707/3 |
| 2006/0069589 A1 * | | 3/2006 | Nigam et al. ..................... 705/1 |
| 2006/0089927 A1 | | 4/2006 | Bandyopadhyay et al. |
| 2006/0206306 A1 * | | 9/2006 | Cao et al. .......................... 704/4 |

(Continued)

OTHER PUBLICATIONS

Rosie Jones, Benjamin Rey and Omid Madani, Wiley Greiner Generating Query Substitutions May 2006, ACM.*

(Continued)

*Primary Examiner* — Polina Peach
(74) *Attorney, Agent, or Firm* — Lee & Hayes, PLLC (57) ABSTRACT

Identifying synonyms of entities using a collection of documents is disclosed herein. In some aspects, a document from a collection of documents may be analyzed to identify hit sequences that include one or more tokens (e.g., words, number, etc.). The hit sequences may then be used to generate discriminating token sets (DTS's) that are subsets of both the hit sequences and the entity names. The DTS's are matched with corresponding entity names, and then used to create DTS phrases by selecting adjacent text in the document that is proximate to the DTS. The DTS phrases may be analyzed to determine whether the corresponding DTS is synonyms of the entity name. In various aspects, the tokens of an associated entity name that are present in the DTS phrases are used to generate a score for the DTS. When the score at least reaches a threshold, the DTS may be designated as a synonym. A list of synonyms may be generated for each entity name.

13 Claims, 9 Drawing Sheets

(56) References Cited

U.S. PATENT DOCUMENTS

| | | | |
|---|---|---|---|
| 2006/0218136 | A1 | 9/2006 | Surakka et al. |
| 2007/0043723 | A1 | 2/2007 | Bitan et al. |
| 2007/0073745 | A1* | 3/2007 | Scott et al. .................... 707/100 |
| 2007/0192085 | A1* | 8/2007 | Roulland et al. ................. 704/9 |
| 2007/0239742 | A1 | 10/2007 | Saha et al. |
| 2008/0016040 | A1 | 1/2008 | Jones et al. |
| 2008/0021898 | A1 | 1/2008 | Hoglund |
| 2008/0147618 | A1 | 6/2008 | Bauche |
| 2008/0275837 | A1 | 11/2008 | Lambov |
| 2012/0117078 | A1* | 5/2012 | Morton et al. ................ 707/741 |

OTHER PUBLICATIONS

Rosie Jones, Benjamin Rey and Omid Madani, Wiley Greiner "Generating Query Substitutions", May 2006, ACM.*

Gerald J. Kowalski, Mark T. Maybury "Information Storage and Retrieval Systems", 2002 Kluwer Academic Publishers.*

Ioannis P. Klapaftis, Suresh Manandhar "Google & WordNet based Word Sense Disambiguation", 2005, Workshop on Learning & Extending Ontologies, Bonn, Germany.*

Non-Final Office Action for U.S. Appl. No. 12/465,832, mailed on May 23, 2011, Surajit Chaudhuri, "Identifying Synonyms of Entities Using Web Search," 19 pages.

Agrawal, et al., "Mining Association Rules Between Sets of Items in Large Databases", retrieved on Mar. 9, 2009 at <<http://rakesh.agrawal-family.com/papers/sigmod93assoc.pdf>>, Proceedings of the 1993 ACM SIGMOD Conference, Washington DC., May 1993, pp. 1-10.

Agrawal, et al., "Scalable Ad-hoc Entity Extraction from Text Collections", retrieved on Mar. 9, 2009 at <<http://www.cs.uwaterloo.ca/~ilyas/CS848F08/papers/agrawal2008.pdf>>, VLDB 2008, Aug. 24-30, 2008, Auckland, New Zealand, pp. 945-957.

Aho, et al., "Efficient String Matching: An Aid to Bibliographic Search", retrieved on Mar. 9, 2009 at <<http://www.win.tue.nl/~watson/2R080/opdracht/p333-aho-corasick.pdf>>, Association for Computing Machinery, Inc., 1975, pp. 333-340.

Arasu, et al., "Efficient Exact Set-Similarity Joins", retrieved on Mar. 9, 2009 at <<http://www.vldb.org/conf/2006/p918-arasu.pdf>>, VLDH 2006, Sep. 12-15, 2006, Seoul, Korea, pp. 918-929.

Bohn, "Extracting Named Entities and Synonyms from Wikipedia for use in News Search", retrieved on Mar. 9, 2009 at <<http://daim.idi.ntnu.no/masteroppgaver/IME/IDI/2008/4290/masteroppgave.pdf>>, Norwegian University of Science and Technology, Department of Computer and Information Science, Jun. 2008, 95 pages.

Chakrabarti, et al., "An Efficient Filter for Approximate Membership Checking", retrieved on Mar. 9, 2009 at <<http://portal.acm.org/ft_gateway.cfm?id=1376697&type=pdf&coll=GUIDE&dl=GUIDE&C FID=25892410&CFTOKEN=82733085>>, SIGMOD 2008, Jun. 9-12, 2008, Vancouver, BC., Canada, pp. 805-817.

Chandel, et al., "Efficient Batch Top-k Search for Dictionary-based Entity Recognition", retrieved on Mar. 9, 2009 at <<http://www.it.iitb.ac.in/~sunita/papers/icde06b.pdf>>, ITT Bombay, pp. 1-10.

Chaudhuri, et al., "A Primitive Operator for Similarity Joins in Data Cleaning", retrieved on Mar. 9, 2009 at <<http://research.microsoft.com/pubs/76166/ssjoin.pdf>>, Microsoft Research, 12 pages.

Cheng, et al., "EntityRank: Searching Entities Directly and Holistically", retrieved on Mar. 9, 2009 at <<http://portal.acm.org/ft_gateway.cfm?id=1325898&type=pdf&coll=GUIDE&dl=GUIDE&CFID=25898894&CFTOKEN=45660346>>, VLDB 2007, Sep. 23-28, 2007, Vienna, Austria, pp. 387-398.

Cohen, et al., "Exploiting Dictionaries in Named Entity Extraction: Combining Semi-Markov Extraction Processes and Data Integration Methods", retrieved on Mar. 9, 2009 at <<http://www.cs.cmu.edu/~wcohen/postscript/kdd-04-csmm.pdf>>, KDD 2004, Aug. 22-25, 2004, Seattle, WA., 10 pages.

Dong, et al., "Reference Reconciliation in Complex Information Spaces", retrieved on Mar. 9, 2009 at <<http://db.cs.washington.edu/semex/reconciliation_sigmod.pdf>>, SIGACM-SIGMOD 2005, Baltimore, Maryland, 12 pages.

Ganti, et al., "Entity Categorization Over Large Document Collections", retrieved on Mar. 9, 2009 at <<KDD 2008, Aug. 24-27, 2008, Las Vegas, Nevada, pp. 274-282.

Gligorov, et al., "Using Google Distance to Weight Approximate Ontology Matches", retrieved on Mar. 5, 2009 at <<http://www.cs.vu.nl/~frankh/postscript/BNAIC07-WWW07.pdf>>, Proc. of World Wide Web Conf., 2007, 2 pages.

Han, et al., "Data Mining: Concepts and Techniques", retrieved on Mar. 9, 2009 at <<http://www.ir.iit.edu/~dagr/DataMiningCourse/Spring2001/BookNotes/4lang.pdf>>, Intelligent Database Systems Research Lab, School of Computing Science, Simon Fraser University, Canada, 5 pages.

Hu, "ApproxSeek: Web Document Search Using Approximate Matching", retrieved on Mar. 5, 2009 at <<http://citeseerx.ist.psu.edu/viewdoc/download;jsessionid=F776964F00B448D5445A84C3528F0E83?doi=10.1.1.44.8602&rep=rep1&type=pdf>>, The Fifth International Conference on Computer Science and Informatics, Sep. 1999, pp. 1-5.

Kasliwal, et al., "Text Mining in Biomedical Literature", retrieved on Mar. 9, 2009 at <<http://www.cse.iitb.ac.in/~sourabh/seminar/final/seminar_report>>, Department of Computer Science and Engineering, Indian Institute of Technology, Bombay, India, 27 pages.

Koudas, et al., "Record Linkage: Similarity Measures and Algorithms", retrieved on Mar. 9, 2009 at <<http://queens.db.toronto.edu/~koudas/docs/aj.pdf>>, 130 pages.

Turney, "Mining the Web for Synonyms: PMI-IR versus LSA on TOEFL", retrieved on Mar. 9, 2009 at <<http://extractor.iit.nrc.ca/publications/ECML2001.pdf>>, Institute for Information Technology, National Research Council of Canada, Ottawa, Canada, pp. 1-12.

Final Office Action for U.S. Appl. No. 12/465,832, mailed on Oct. 7, 2011, Surajit Chaudhuri, "Identifying Synonyms of Entities Using Web Search", 13 pages.

Smeaton et al., "Experiments on Incorporating Syntactic Processing of User Queries into a Document Retrieval Strategy", Proceedings of the 11th Annual International ACM SIGIR Conference on Research and Development of Information Retrieval (SIGR'88), Jun. 1988, pp. 31-51.

Office Action for U.S. Appl. No. 12/465,832, mailed on Apr. 10, 2012, Surajit Chaudhuri, "Identifying Synonyms of Entities Using Web Search", 16 pgs.

Office action for U.S. Appl. No. 12/465,832, mailed on Sep. 19, 2012, Chaudhuri et al., "Identifying Synonyms of Entities Using Web Search", 18pages.

* cited by examiner

IDENTIFYING SYNONYMS OF ENTITIES USING A DOCUMENT COLLECTION

BACKGROUND

The Internet enables access to a vast archive of data that may be exploited to provide users with a great wealth of information. However, the enormous amount of information made available via the Internet may also be difficult navigate. For example, a search of the Internet using a term that is too generic may result in millions of results, many of which are unhelpful to a search recipient. Conversely, a search that is too specific or narrow may exclude many pertinent results that may be helpful to the search recipient.

When authors generate documents for publication, such as via the Internet, the authors are typically free to select descriptors (names, identifiers, etc.) for entities discussed in their documents. Often, authors shorten a long identifier of an entity (e.g., product, title, or other identifier) to create a shorter phrase to refer to the entity. These phrases can be an individual's preferred description of the entity. Thus, the descriptor is a short identifier of the entity's conventional name. Some entities include many descriptors which may make locating an entity during an Internet search more difficult than if the entity used a same identifier.

In an example, an author may refer to a product (entity) by only the model number (a possible descriptor) rather than a longer conventional name that may include the manufacturer, class, or other identifying features listed in a complete (formal) identifier of the product. Additionally, some authors may select different descriptors for identical entities such that an Internet search of only one descriptor may not retrieve all documents discussing the entity because some authors do not use the searched descriptor.

SUMMARY

Identifying synonyms of entities using a collection of documents is disclosed herein. In some aspects, a document from a collection of documents may be analyzed to identify hit sequences that include one or more tokens (e.g., words, numbers, etc.) of entities in an entity list. The hit sequences may be matched to the entities to determine discriminating token sets (DTS) that are sub-sequences of the hit sequences. Next, the DTS's may be used to generate a DTS phrase by selecting adjacent text that is proximate the DTS in the document. The DTS phrase may be analyzed to determine whether the corresponding DTS is a synonym of the entity name(s) by comparing a score assigned to the DTS, based on the DTS phrase, over various occurrences of the DTS, which are likely in a large document collection.

In various aspects, the tokens of an associated entity name that are present in the DTS phrase are used to generate a score for the DTS. The score may be aggregated for many instances (e.g., documents). When the aggregated score at least reaches a threshold, the DTS may be designated as a synonym. A list of synonyms may be generated for each entity name.

In further aspects, the hit sequences may be arranged in a suffix tree. The suffix tree may be analyzed to identify suffix links, which may be exploited to efficiently map DTS's to entity names, thus reducing redundancy during processing and identification of the synonyms.

This summary is provided to introduce simplified concepts of identifying synonyms of entity names, which is further described below in the Detailed Description. This summary is not intended to identify essential features of the claimed subject matter, nor is it intended for use in determining the scope of the claimed subject matter.

BRIEF DESCRIPTION OF THE DRAWINGS

The Detailed Description is described with reference to the accompanying figures. In the figures, the left-most digit(s) of a reference number identifies the figure in which the reference number first appears. The same reference number in different figures refers to similar or identical items.

DETAILED DESCRIPTION

Overview

To enable more comprehensive document searches, it may be desirable to identify "synonyms," of entity names by exploiting usage of the entity names in a document collection. The entity names are author-generated descriptors that are used to reference an entity. Synonyms with a strong correlation to the entity name may be identified by analyzing multiple uses of the synonym in various documents. Synonyms may be helpful to enable searching documents sources, such as the Internet, to locate relevant information for an entity.

Synonyms of an entity name may be determined after analyzing discriminating token sets (DTS's) extracted from a document collection. The DTS's may be used to create DTS phrases which include groups of text that surround the DTS in the documents. The DTS phrases may be analyzed to determine whether corresponding DTS's are synonyms of the entity name. A list of synonyms may be generated for an entity name. These techniques, and others, are discussed in more detail below.

Illustrative Environment

Figure 1:
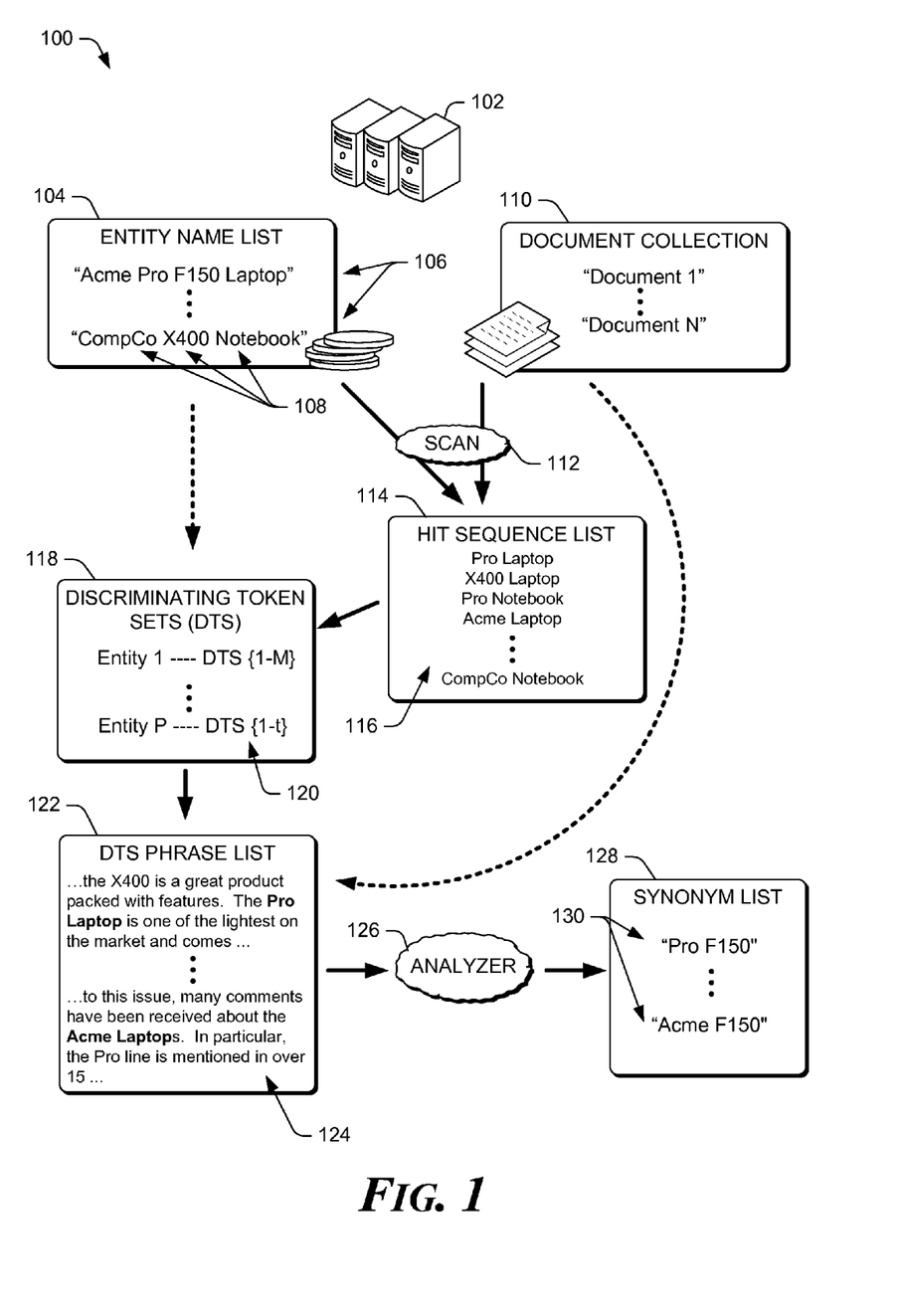
FIG. 1 is a schematic of an illustrative environment to enable identifying synonyms of entities using a document collection.

FIG. 1 is a schematic of an illustrative environment 100 to enable identifying synonyms of entities using a document collection. The environment 100 may include one or more servers 102 that are used to process data, communicate with other computing devices via a network, and output data for storage and/or display to a user.

The servers 102 may store an entity name list 104 that includes entity names 106. The entity names 106 may be conventional names of known entities. The entities may be products, titles, subjects, or anything else an author may use to describe something of interest. For example, the entity name 106 of a particular computer may be "Acme Pro F150 Laptop." The entity names 106 are formed of a combination of tokens 108. The tokens 108 may be words, numbers, symbols, objects, and so forth (or a combination thereof). For example, "Acme," "Pro," "F150," and "Laptop" are the tokens 108 of the entity name 106 of "Acme Pro F150 Laptop."

In addition, the servers 102 may also include a document collection 110. The document collection 110 may be stored locally or remotely and made available to the servers 102. For example, the document collection 110 may be made available for access via the Internet, a document library, or other large repository of documents.

In accordance with various embodiments, the servers 102 may perform a scan operation 112 (i.e., review, search) of documents in the document collection 110 for one or more instances of the tokens 108 to generate a hit sequence list 114. In some embodiments, the scan operation 112 is performed by scanning for individual tokens, contiguous token pairs, or other instances of the tokens 108, which create hit sequences 116. The hit sequences 116 may be contiguous instances of tokens from the entity names 106 and may be of any length of tokens. In various embodiments, the scan operation 112 may systematically extract token combinations as the hit sequences 116 from a document to populate the hit sequence list 114 and then advance to another document in the document collection until all documents have been scanned and all hit sequences have been obtained. In this way, a large document collection may be "pruned" to only include relevant instances of the hit sequences 116 that are stored in the hit sequence list 114. In some embodiments, multiple instances of the hit sequences 116 may be extracted from a single document while other documents may not include any instances of the hit sequences (e.g., a document of the document collection 110 does not discuss the entities names 106).

In some embodiments, the hit sequences 116 may be matched to the entity name list 104 to populate a discriminating token set (DTS) list 118 of DTS's 120. The DTS 120 is a sub-sequence of the hit sequence 116 and a subset of the entity name 106, which is matched to the DTS. As a subset of tokens of the entities, the DTS 120 may discriminate a corresponding entity from the other entities in the entity name list because a frequency of the DTS over the entity list is small. For example, the entity name "Acme Pro F150 Laptop" may have a DTS of "Acme Pro" which is a sub-sequence of a hit sequence of "Acme Pro Notebook." After each document is subjected to the scanning operation 112, some entities may include multiple DTS's while other entities may not have a DTS from each document.

In accordance with various embodiments, the DTS's 120 may be combined with data from the document collection 110 to populate a DTS phrase list 122 of DTS phrases 124. The DTS phrase 124 includes the DTS 120 and a predetermined number of tokens that are adjacent to the DTS 120 in the document where the DTS appears. In some embodiments, the DTS phrases 124 may be populated by scanning the document collection 110 a second time. The quantity of the accompanying tokens (thus the size of the DTS phrase 124 including the hit sequence 116) may be predetermined and stored as an input variable. For example, the input variable may determine the number of tokens (e.g., words, characters, etc.) that are selected before/after the hit sequence 116 to define the DTS phrase 124.

An analyzer 126 may analyze the DTS phrases 124 of the DTS phrase list 122. In some embodiments, the analyzer 126 may analyze the DTS phrases 124 to identify a count of the tokens 108 of the entity names 106, or other relevant data to determine whether the DTS 120 of the DTS phrase 124 is a synonym of one of the entity names 106. When the analyzer 126 determines that the DTS 120 in the DTS phrase 124 is a synonym of the entity name, then the DTS 120 may be stored in a synonym list 128 as a synonym 130. Otherwise, the DTS 120 may be omitted from being included as a synonym.

Figure 2:
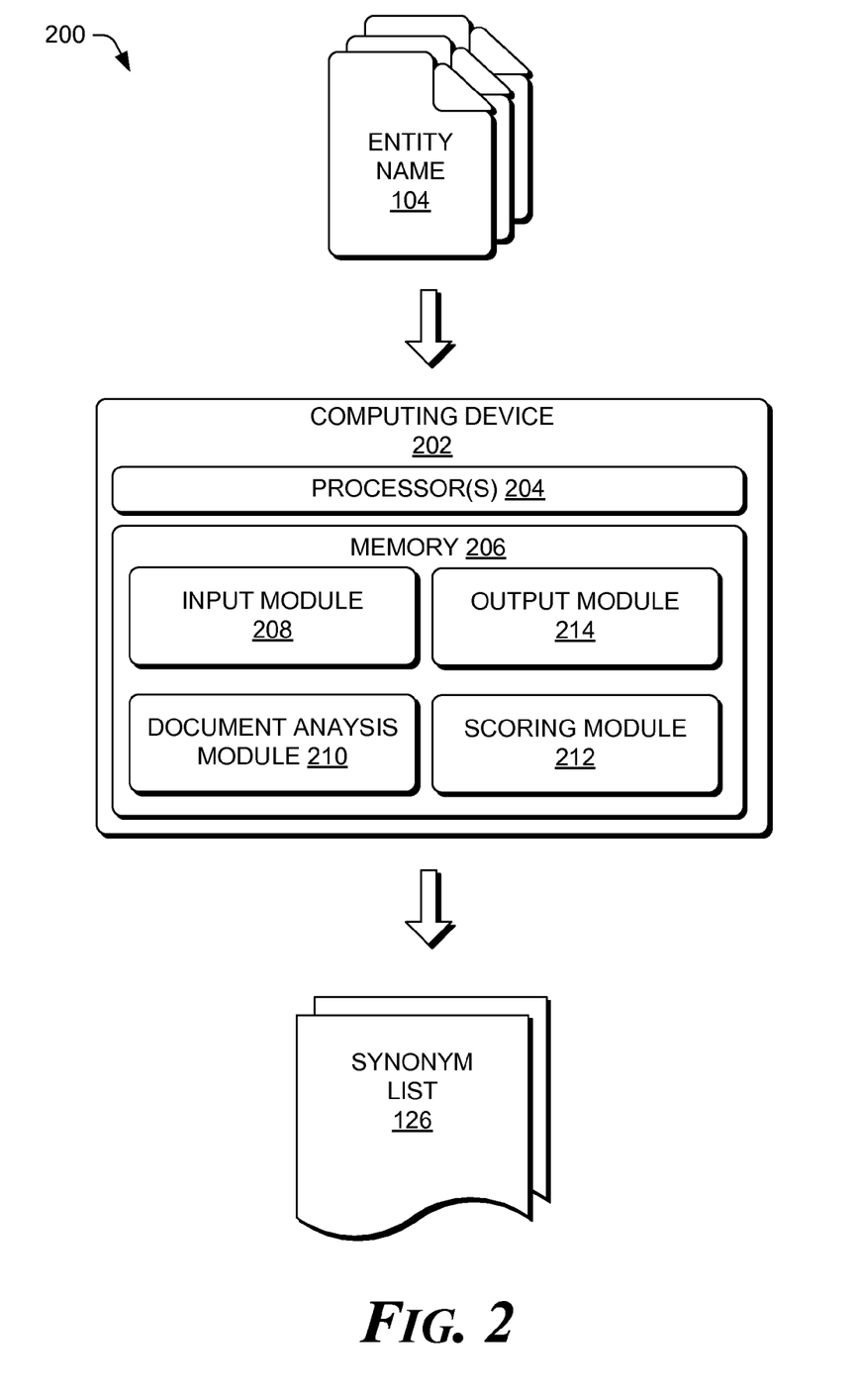
FIG. 2 is a block diagram of an illustrative computing environment to process an entity name via a computing device to generate a synonym list.

FIG. 2 is a block diagram of an illustrative computing environment 200 that may be used to process the entity name 106 via a computing device 202 to generate a synonym list. The environment 200 includes the computing device 202 that may be configured to receive the entity name 106, which may be tested and/or analyzed to ultimately generate the synonym list 128. The entity name 106 may be determined by a producer of the entity (e.g., author, designer, etc.), an authority such as a dictionary, or from other sources. The synonym list 128 may be stored for future use such as on a tangible storage medium (via local or remote storage). In an example, the synonym list 128 may be used to locate a comprehensive list of documents (e.g., via an Internet search, database search, etc.) that discuss the entity. The documents may be used for various purposes, such as for analyzing offers for sale of the entity, determining a sentiment of the documents for the entity, or for other research, analysis, or exploitation.

The computing device 202 may include one or more processors 204 and a memory 206. The memory 206 may include volatile and/or nonvolatile memory, removable and non-removable media implemented in any method or technology for storage of information, such as computer-readable instructions, data structures, program modules or other data. The memory 206 of the computing device 202 may store a number of components such as an input module 208, a document analysis module 210, a scoring module 212, and an output module 214, among other possible components.

The input module 208 may be configured to receive the entity name(s) 106 for processing by the computing device 202. For example, without limitation, the input module 208 may include a user interface that enables a user to selectively provide one or more of the entity names 106, which may be received by the input module 208 and stored by the computing device 202 for further processing.

In some embodiments, the document analysis module 210 may perform a variety of operations that may begin by identifying the hit sequences 116 in the document collection 110. The document analysis module 210 may also determine the DTS's 118 from the hit sequences 116 and match the DTS's 118 to a corresponding one of the entity names 106. In addition, the document analysis module 210 may extract token strings from a document of the document collection using the tokens 108 of the entity names 106, which ultimately may produce the DTS phrase list 122 of the DTS phrases 124.

In accordance with various embodiments, the scoring module 212 may analyze the DTS phrases 124, in combination with other available data such as the entity names 106, the tokens 108, and so forth to generate a score for the DTS 120 for an entity. The score may be compared to a threshold value, which when reached and/or surpassed by the score, indicates that the DTS 120 is a synonym of one of the entity names 106. The threshold may be determined by selecting a value that, when reached or exceeded by the score, indicates that the DTS 120 is a synonym 130 of the entity names 106.

Finally, the output module 214 may output synonyms 130 for inclusion in the synonym list 128. For example, the output module 214 may store a DTS of the DTS's 120 as the synonym 130 in the synonym list 128 when the score indicates that the DTS is a synonym (e.g., after comparison to a threshold, etc.). The synonyms 130 may be stored in the synonym list 128 upon designation as a synonym or the synonyms may be stored in the synonym list via a batch process.

Illustrative Operation

Figure 3:
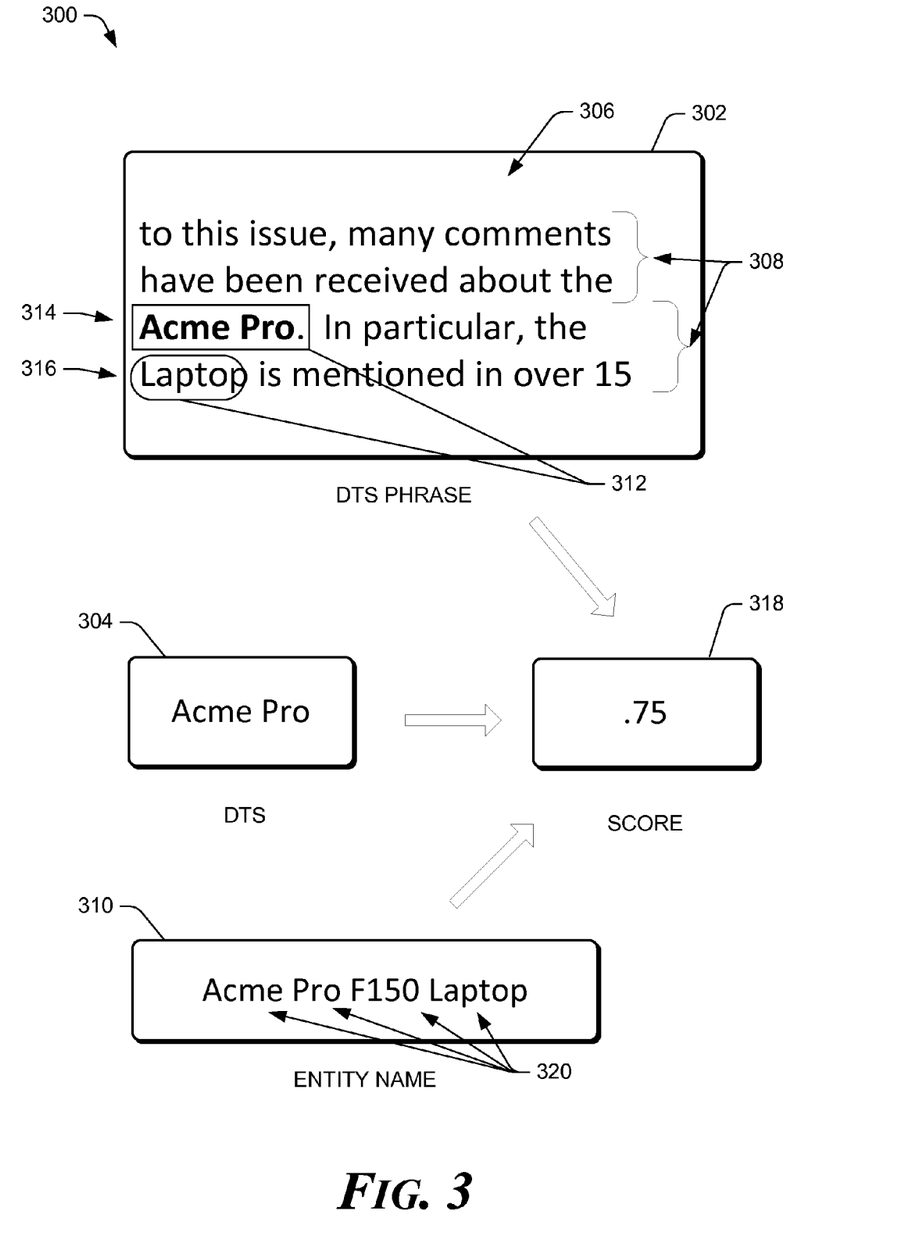
FIG. 3 is a block diagram of an illustrative data structure to enable use of DTS phrases from a document collection to generate a score for a corresponding DTS associated with an entity name.

FIG. 3 is a block diagram of an illustrative data structure 300 to enable use of DTS phrases from a document collection to generate a score for a corresponding DTS associated with an entity name. The data structure 300 may use a DTS phrase 302 that includes tokens (terms) of the DTS 304 (e.g., "Acme" and "Laptop"). The DTS phrase 302 may be generated from a selection of a predetermined amount of the text 306 using a gap 308 (e.g., words, characters, symbols, and the like) from before and/or after an occurrence of the DTS 304 in a document. For example, the DTS phrase 302 may include the gap 308 of twenty tokens (ten words/numbers before and after the DTS 304) such that a total of 22 (10 before+2 hit sequence+10 after=22) words/numbers are included in the DTS phrase 302. In some embodiments, the gap 308 may be selected on either side (before/after) the hit sequence or may include different values for before/after the hit sequence.

The text 306 of the DTS phrase 302 may include some instances of tokens 312 that are included in an entity name 310 in addition to the tokens of the DTS 304. For example, some of the tokens 312 may be DTS tokens 314 of the DTS 304 while other instances of entity tokens 316 may not be included in the DTS 304. Some of the tokens may be contiguous while other tokens may be separated by various amounts of the text 306.

In accordance with some embodiments, a score 318 may be generated for the DTS 304 based on the tokens 312 located in the DTS phrase 302. For example, the score 318 may be based on the number or percent of the tokens 312 (e.g., absolute, unique occurrence, etc.) in the DTS phrase 302 as compared to tokens 320 of the entity name. Additional details of scoring techniques are discussed below with reference to FIG. 4. The score 318 may then be used to determine whether the DTS 304, which is derived via the document search 110, is a synonym of the entity name 310.

Figure 4:
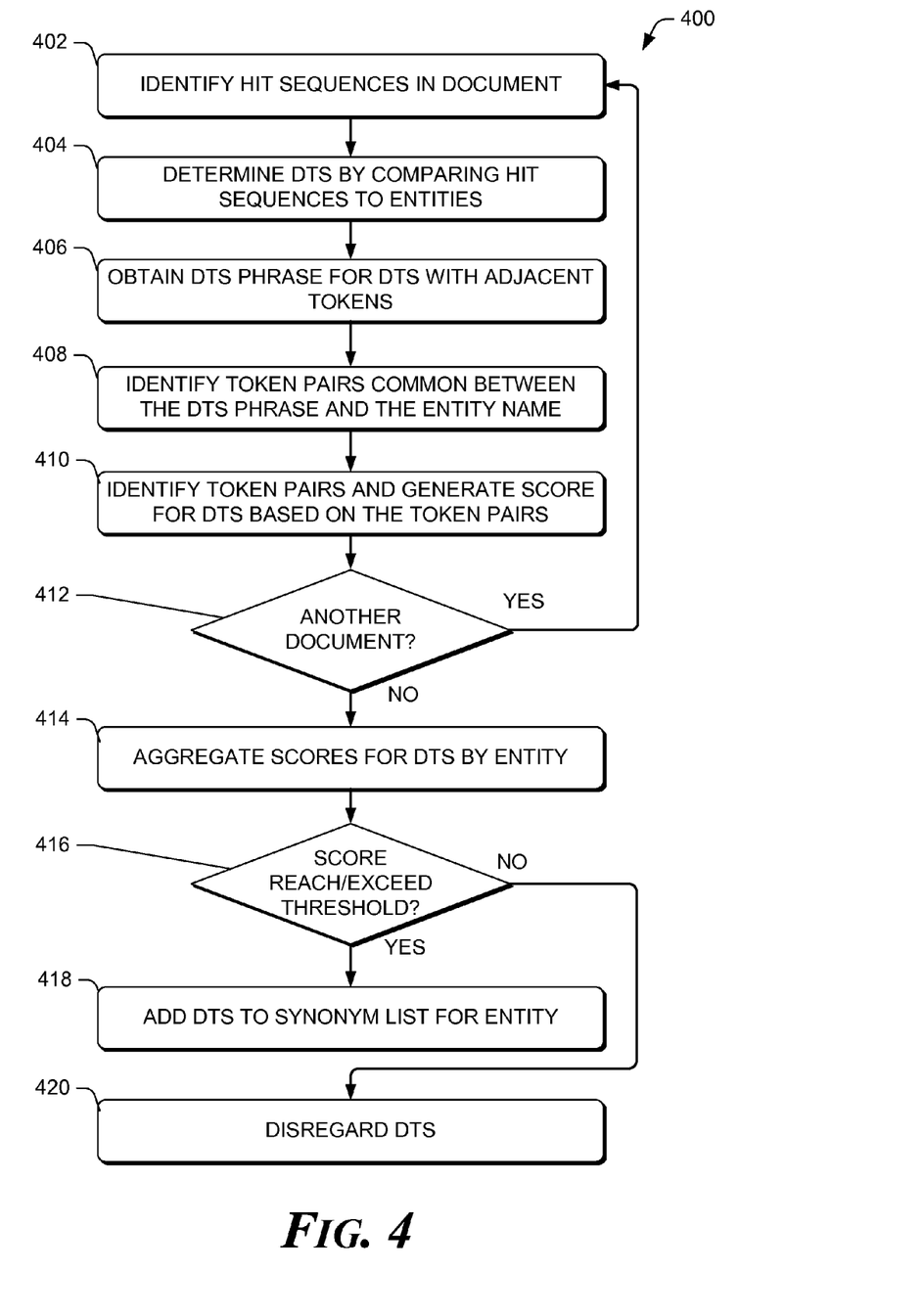
FIG. 4 is a flow diagram of an illustrative process of identifying synonyms of entities using a document collection.

FIG. 4 is a flow diagram of an illustrative process 400 of identifying synonyms of entities using a document collection. The process 400 is illustrated as a collection of blocks in a logical flow graph, which represent a sequence of operations that can be implemented in hardware, software, or a combination thereof. The collection of blocks is organized under respective entities that may perform the various operations described in the blocks. In the context of software, the blocks represent computer-executable instructions that, when executed by one or more processors, cause the one or more processors to perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. Other processes described throughout this disclosure, in addition to the process 400, shall be interpreted accordingly. The process 400 is described with reference to FIGS. 1-3.

At 402, the document analysis module 210 may identify the hit sequences 116 in a document of the document collection 110. For example, the tokens 108 of the entity names 106 may be used to identify the hit sequences 116. In some embodiments, the servers 102 may perform the operation 402 by scanning each document of the document collection 110. The hit sequences 116 may be defined as any consecutive grouping of tokens in a document where the tokens are a subset of the tokens 108 in the entity name list 104.

At 404, the document analysis module 210 may determine the DTS 120 by comparing the hit sequences 116 to the entity names 106. The DTS 120 may be determined as a subset of both the hit sequence 116 and an associated one of the entity names 106. The DTS 120 may be associated with the entity name 106.

At 406, the document analysis module 210 may obtain the DTS phrase 124 for each DTS 120. The DTS phrase 124 may include a predetermined number of tokens (the gap 308) that are adjacent to the DTS 120 as originally located in the document of the document collection 110. In some embodiments, the document may be scanned a second time to obtain the DTS phrase 124.

At 408, the document analysis module 210 may identify token pairs that are common between the entity name and the DTS phrase associated with the entity name. The token pairs may be tokens in the gap of the DTS phrase 124 (or 302 in FIG. 3) that are obtained at the operation 406. The token pairs may be tokens that are a subset of both the entity name and the DTS phrase.

At 410, the scoring module 212 compute the score 318 for the token pairs of the DTS's 120. In some embodiments, the score 318 may be assigned to each of the DTS's 120 based on whether all (or a predetermined number) of the tokens 108 of the entity name 106 are included in the DTS phrase 124 as the token pairs, thus the score may be either one or zero {0,1}. For example, a value of "1" may be assigned to DTS with at least one occurrence of each of the tokens 108 in the DTS phrase. In various embodiments, other techniques and/or calculations may be used to generate the score 318 for each of the DTS's 120. For example, the score 318 may be generated that weighs the quantity of the tokens in the token pairs. The score may result in a fractional score (e.g., 0.33 for one third of the tokens in the DTS phrase). Other scoring algorithms are contemplated that provide different weights to tokens (absolute, linear, exponential, etc.) that are included in the DTS phrase.

At 412, the servers 102 may determine whether another document should be analyzed using the operations 402-410. If another document is analyzed, the process 400 may continue at the operation 402. When there are no additional documents, the process may continue at 414.

At 414, the scoring module 212 may compute an aggregate score that is representative of the score 318 for each unique instance of the DTS's 120 (e.g., average, median, etc.). Aggregating (e.g., averaging, etc.) all the scores of all of the DTS occurrences across multiple documents may generate an aggregate score for each of the DTS's 120.

At 416, the scoring module 212 may determine whether the aggregate score generated at 416 (or the score at 410) at least reaches a threshold. When the score at least reaches the threshold, the DTS 120 may be designated as a synonym and added to the synonym list 128 at 418. When the score fails to at least reach the threshold, the DTS 120 may be omitted from the synonym list 128 at 420.

In accordance with various embodiments, the document analysis module 208 may perform the operations of the process 400 using an approach that scans the document once, twice, or more times to obtain the hit sequences and the DTS phrases. The number of document scans may be determined in part based on the size of the entity name list 104 and/or a size of the document collection 110.

A two-scan approach includes a first scan of a document to obtain the hit sequences 116 and then a second scan of the document to obtain the gap 308 for the DTS phrase 124 (or 302). A single-scan approach may be implemented when the number of entities is small enough that memory is not overrun during processing by the document analysis module 208. An index may be maintained for each token in the documents where the documents are cached in memory. However, this single-scan approach may not be feasible when the document collection 110 is sizable such that it is not feasible or practical to load an entity ID list (index) of the entities into memory because of memory capacity constraints. In these cases, the two-scan approach may be an efficient alternative to the single-scan approach.

In some embodiments, a map-reduce framework may be implemented to enable processing of large document collections. The map-reduce is a software framework that supports parallel computations over large data sets on clusters of computers. This framework consists of a "map" phase and a "reduce" phase. In the map phase, the master node separates the original problem up into smaller sub-problems and then distributes the sub-problems to multiple worker nodes. The worker nodes process the sub-problems problems to generate answers, which are then passed to a reduce phase. In the reduce phase, the master node combines the answers to all the sub-problems to obtain the answer to the original problem.

Additional Embodiments

Figure 5:
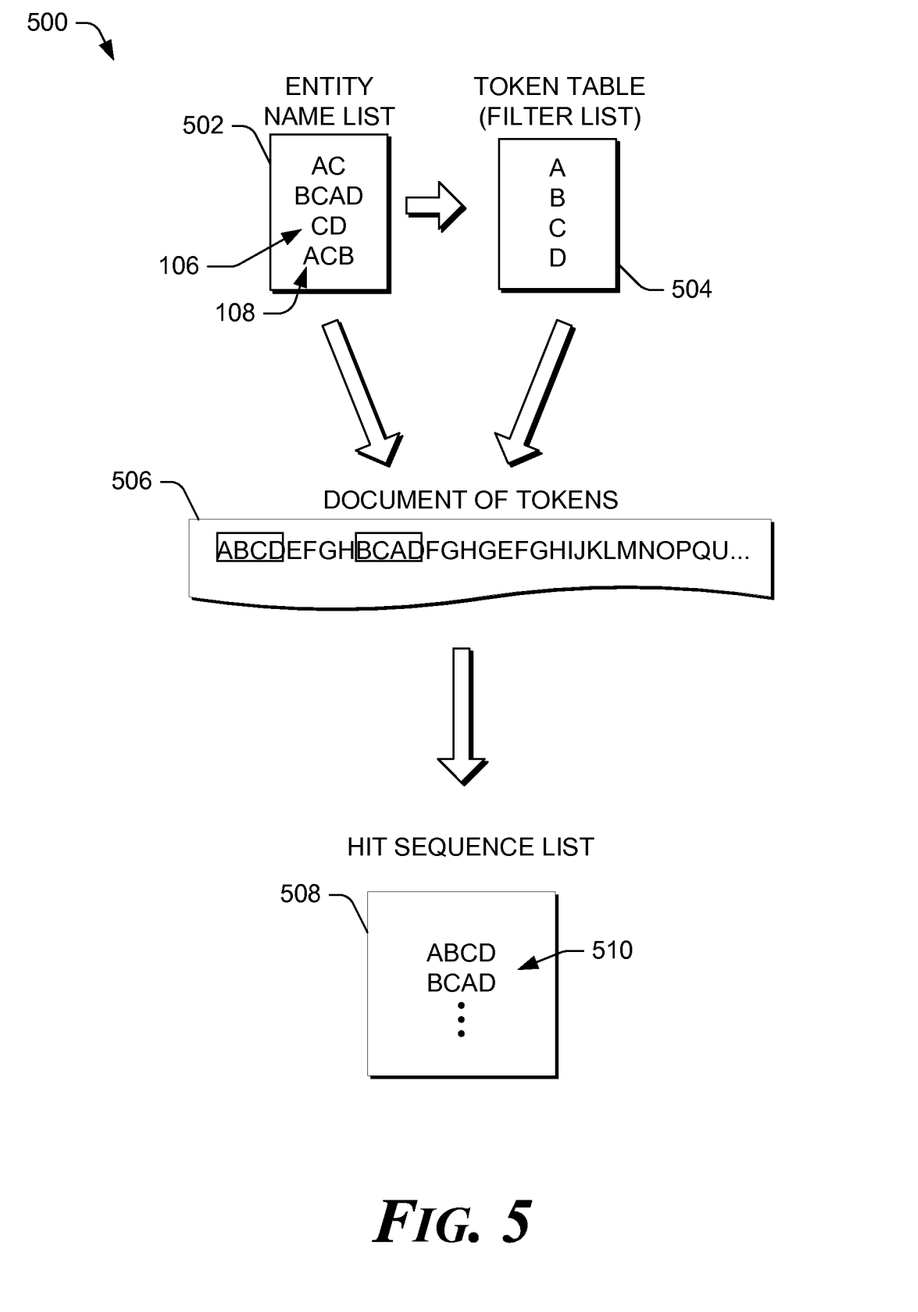
FIG. 5 is a block diagram of an illustrative data structure to enable filtering a selection of tokens from a document collection to generate hit sequences.
Figure 6:
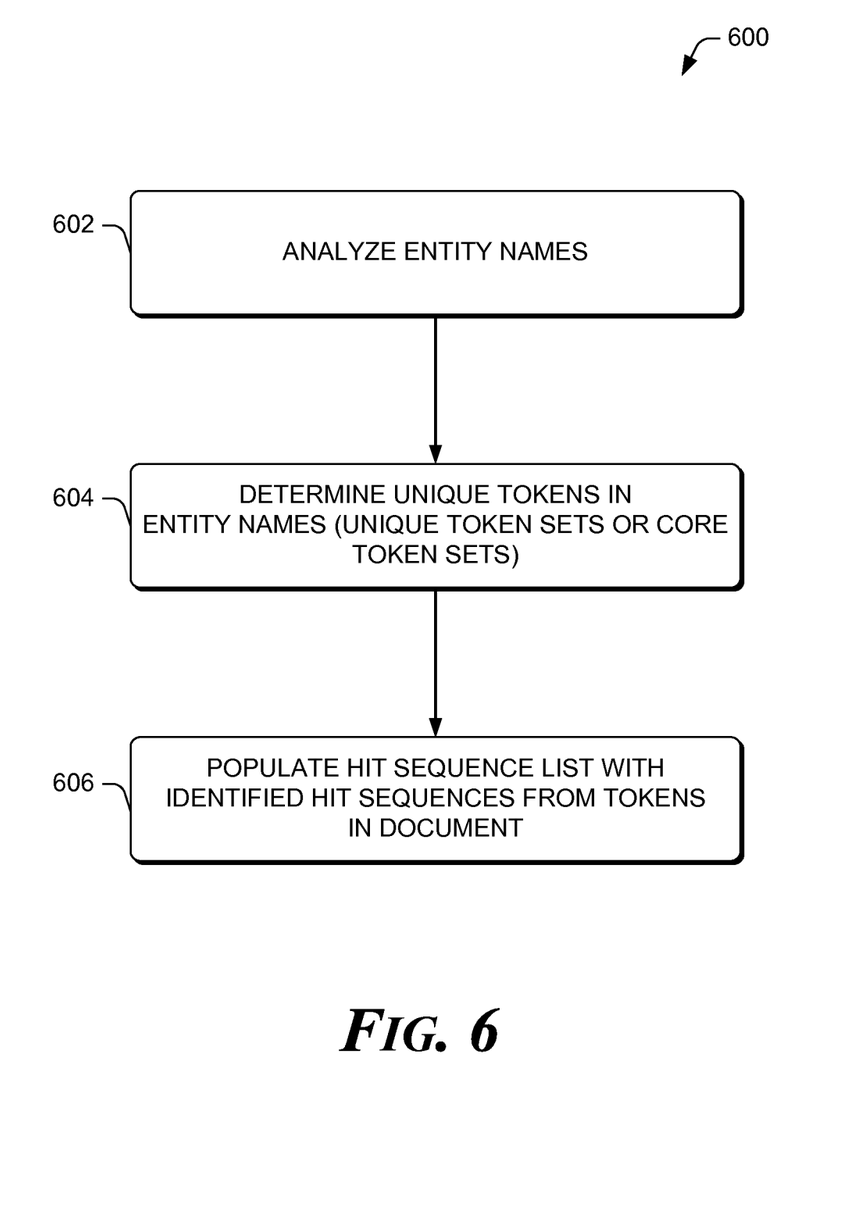
FIG. 6 is a flow diagram of an illustrative process of filtering a selection of tokens from a document collection as shown in FIG. 6
Figure 7:
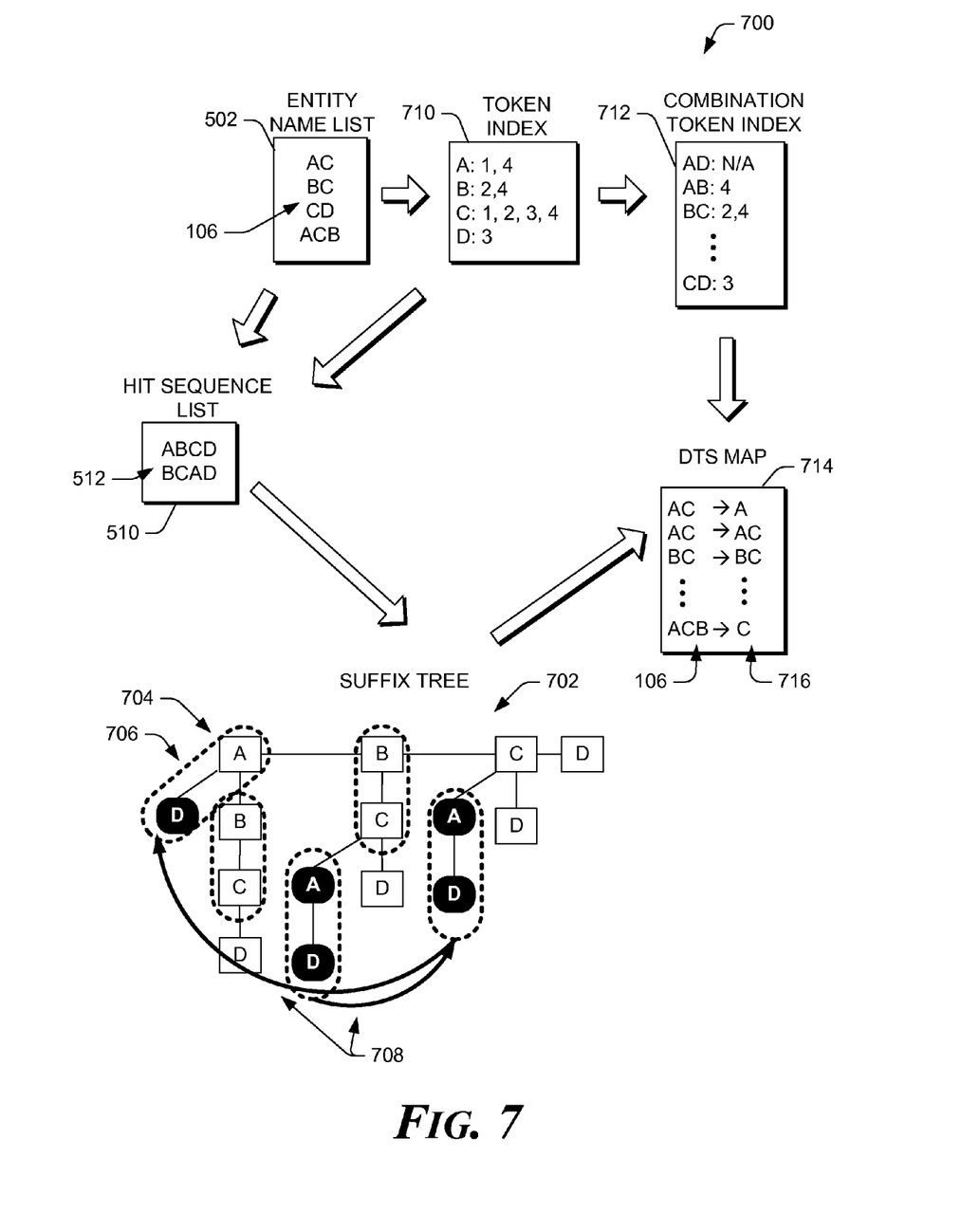
FIG. 7 is a block diagram of an illustrative data structure to enable optimizing discriminating token set association with entities names.
Figure 8:
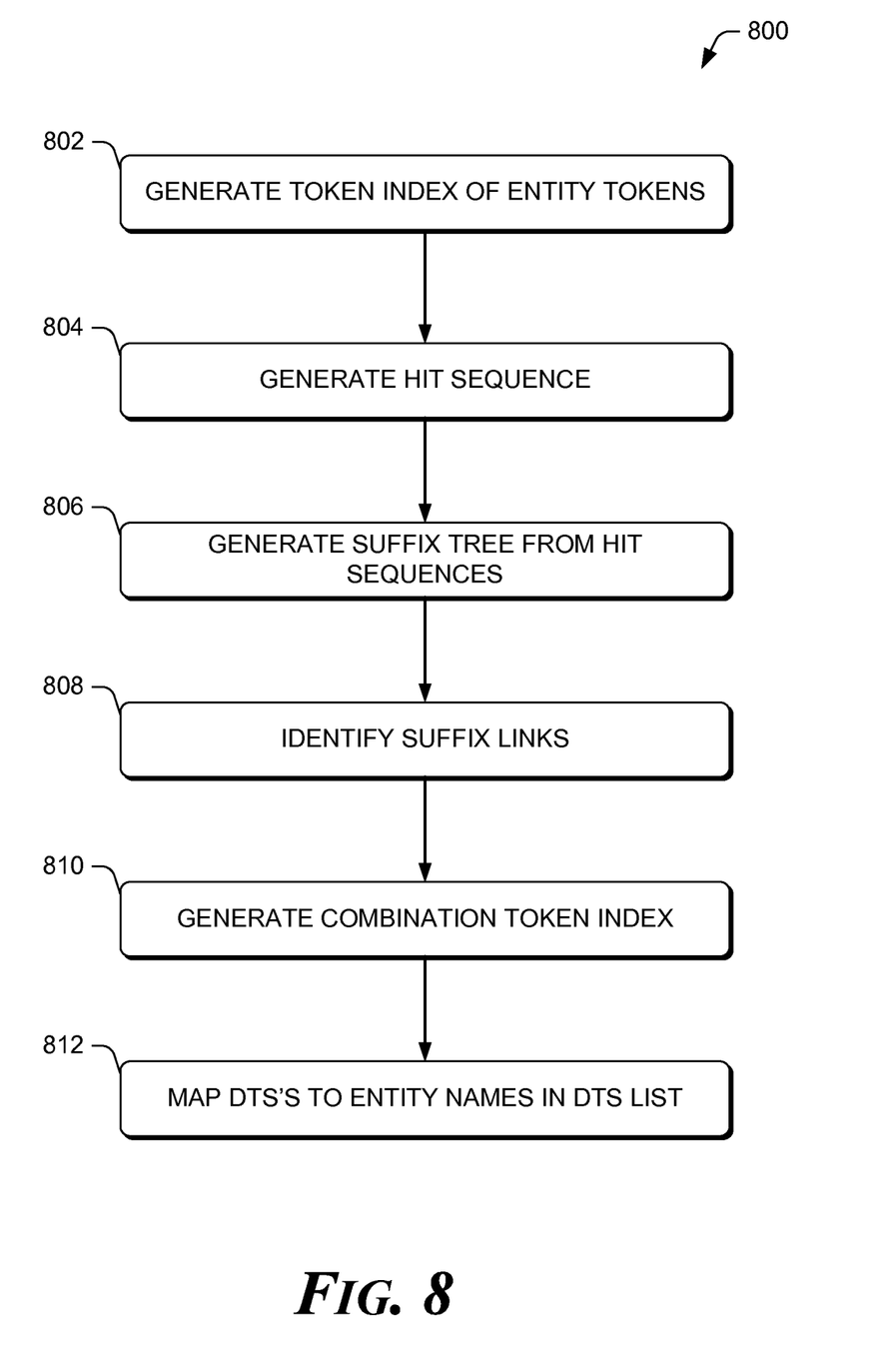
FIG. 8 is a flow diagram of an illustrative process of optimizing discriminating token set association with entities names as shown in FIG. 7.

FIGS. 5-6 provide additional embodiments of identifying the DTS's 120 from the hit sequences 116 for the list of entity names 106. FIGS. 7-8 provide additional embodiments of processing the identified hit sequences to efficiently match the DTS's to the respective entity names to expedite processing and generation of a list of synonyms for each entity name. In FIG. 5 and FIG. 7, for illustrative purposes, the tokens 108 of the entity names 106 are represented by letters. For example, the letter "A" represents a single token, which may be a word, number, symbol, or other representation used in the name of an entity. Thus, an entity name of "BCAD" is intended to represent four unique tokens, which may be representative of an entity name such as "Acme Pro F150 Laptop."

FIG. 5 is a block diagram of an illustrative data structure 500 to enable filtering of a selection of tokens from a document collection to generate hit sequences. In accordance with various embodiments, the data structure 500 may include an entity name list 502. The entity name list 502 may include the entity names 106 (represented by combinations of letters in FIG. 5).

The entity name list 502 may be used to generate a token table 504 as a filter list. The token table 504 may be populated with each unique instance of the tokens 108 of the entity names 106 in the entity name list 502. For example, the entity name list 502 of FIG. 5 includes four unique tokens of {A, B, C, D}.

In various embodiments, a document 506 that contains tokens (represented by combinations of letters in FIG. 5) may be analyzed by the document analysis module 210. The document analysis module 210 may analyze the tokens in the document to populate a hit sequence list 508. The hit sequence list contains various instances of hit sequences 510 that are consecutive arrangements of the tokens of the token table 504 that are identified in the document 506.

In accordance with some embodiments, the hit sequence list 508 may be populated by extracting hit sequences 510 from the document 506, each hit sequence being of a maximum length of contiguous token combinations. Each of the hit sequences 510 may be used to create the DTS's 120, which are ultimately used to generate the DTS phrases 124 by selecting the text 306 of the document based on the gap 308 as shown in FIG. 3. Each of the DTS phrases 124 may be associated with one or more of the DTS's, which may ultimately be scored (e.g., the operation 410 of the process 400) to determine whether the DTS is a synonym of the entity name 106.

FIG. 6 is a flow diagram of an illustrative process 600 of filtering a selection of tokens from a document collection as shown in FIG. 6. The order in which the operations are described is not intended to be construed as a limitation, and any number of the described blocks can be combined in any order and/or in parallel to implement the process 600.

At 602, the server 102 may analyze the entity names 106 of the entity name list 502. In some instances, only a portion of a large collection of entity names may be included in the entity name list. For example, a large group of entity names may be divided into smaller groups of entity names, each being batch processed to determine synonyms of each entity name. In this way, the server 102 may manage memory to prevent buffer overflow or other occurrences that may disrupt processing of the entity names.

At 604, the server 102 may determine unique tokens in the entity names. The unique tokens may be used to populate the token table 504. In some embodiments, the token table 504 can be extended to use core token sets as shown in the operation 604. The core token sets are a collection of "frontier" token sets whose subsets are small (contain less than a predetermined number (L) of tokens) and frequent (occur in more than a predetermined number (K) of entities). A token set S is not a core token set if all of the token set S's immediate subsets (with one less token, i.e., with |S|−1 tokens) are core token sets. The core token sets may have the following properties: (i) linear time (to the document length) table lookup in generating hit sequence; (ii) selective; and/or (iii) compact in size.

At 606, the document analysis module 210 may populate the hit sequence list 508 with identified hit sequences 510 from the tokens in the document 506. The hit sequences 510 may be selected as the longest possible consecutive sequences of tokens from the token table 504 as arranged in the document 506. In some instances, the document 506 may contain no hit sequences while in other instances the document may contain one or more hit sequences 510. Additional documents may be processed according to the process 500 to extract hit sequences from the documents.

FIG. 7 is a block diagram of an illustrative data structure 700 to enable optimizing DTS association with entities names. The data structure 700 may include the entity name list 502 having the entity names 106. The entity name list 502 may be used to generate the hit sequence list 508, which may be generated by implementing the process 600. In some embodiments, a suffix tree 702 may be created from the hit sequences 510 and then used to match DTS's (sub-sequence of the hit sequences 510) to the entity names 106, thus identifying matching pairs of the DTS and entity names.

In accordance with one or more embodiments, the suffix tree 702 may be formed by arranging tokens 704 of the hit sequences 510 as linked groups 706 (e.g., A, A-D, A-B, A-B-C, and so forth). Each of the hit sequences 510 is represented in the suffix tree 702 in the form of the linked groups 706. Suffix links 708 may be leveraged to increase efficiency of processing of the suffix tree 702. The suffix tree 702 is used to batch process the matching of the DTS 120 and the entity names 104 rather than matching the DTS to the entity names on a one-by-one basis, which may be inefficient.

The entity name list 502 may be used to generate a token index 710, which includes a list of each of token in the entity names 106 and a respective entity name position including the token (e.g., "A: 1,4" denotes that the token "A" is present in the entity names in position 1 ("AC") and position 4 ("ACB")). In some embodiments, the token index 710 may be used to generate the hit sequence list 510 by identifying unique instances of the tokens (which may be equivalent to the token table 504 of FIG. 5).

In some embodiments, the token index 710 may then modified as a combination token index 712 that includes indexes for combinations of tokens. For example, the combination of A-D may be Ø (empty set) because A:1,4 does not overlap with D:3 (no common index numbers). The combination of B-C may be BC:2,4 because B:2,4 overlaps with C:1,2,3,4 in two positions. The combination token table 712 may then be exploited to quickly determine any overlaps for the linked group of B-C-A-D by comparing the index of AD to BC (AD: Ø, BC:2,4→BCAD: Ø). Accordingly, the identification and exploitation of the combination token index 712 reduces the processing time of mapping the entity names 106 to the DTS's of the hit sequences 510.

In accordance with various embodiments, a DTS map 714 is generated (via a verification process) using the combination token index 712 (or the token index 710) and the suffix tree 702. The DTS map 714 includes a matching of the entity name 106 and a DTS 716. For example, the token "A" is the DTS 716 of the entity name 106 "AC", which appears in the DTS map 714. However, the tokens "BC" is not one of the DTS's 716 of the entity name 106 "AC", and thus is omitted from the DTS map 714. Finally, the DTS 716 may be used to generate the DTS phrase 124 with the gap 308 as described with reference to FIG. 3.

FIG. 8 is a flow diagram of an illustrative process of optimizing DTS association with entities names as shown in FIG. 7. The order in which the operations are described is not intended to be construed as a limitation, and any number of the described blocks can be combined in any order and/or in parallel to implement the process 800.

At 802, the document analysis module 210 may generate the token index 710 of each token of the entity names 106 with the corresponding entity name for the token. For example, the token "A" as shown in FIG. 7 may include an index of A:1,4 when the first and fourth entity names include the token of "A."

At 804, the document analysis module 210 may generate the hit sequence list 508 that includes the hit sequences 510. In some instances, the filter process 600 (e.g., the operations 606 and/or 608) may be used to select the hit sequences 510 for inclusion in the hit sequence list 508.

At 806, the document analysis module 210 may generate the suffix tree 702 from the hit sequences 510. The suffix tree 702 may be stored as an array of the linked groups 706, or via other techniques to generate and store the suffix tree.

At 808, the document analysis module 210 may identify the suffix links 708 of the suffix tree 702. The suffix links 708 may be leveraged to increase efficiency of processing of the suffix tree 702

At 810, the document analysis module 210 may generate the combination token index 712. The combination token index 712 may be created by determining indexes for token pairs or other groupings of tokens.

At 812, the document analysis module 210 may map the entity names 106 to the DTS 716 of the hit sequences 510 to create the DTS map 714. The DTS map 714 may be created using the combination token index 712 (or the token index 710) and the suffix tree 702 in a verification process. The DTS map 714 may then be used by the operation 404 to retrieve the DTS phrases 124 to populate the DTS phrase list 122. In this way, the process 400 may be performed by including a first optimization of the filter process 600 and a second optimization of the suffix link process 800 to efficiently identify synonyms for entity names from the document collection 112.

Illustrative Computing System

Figure 9:
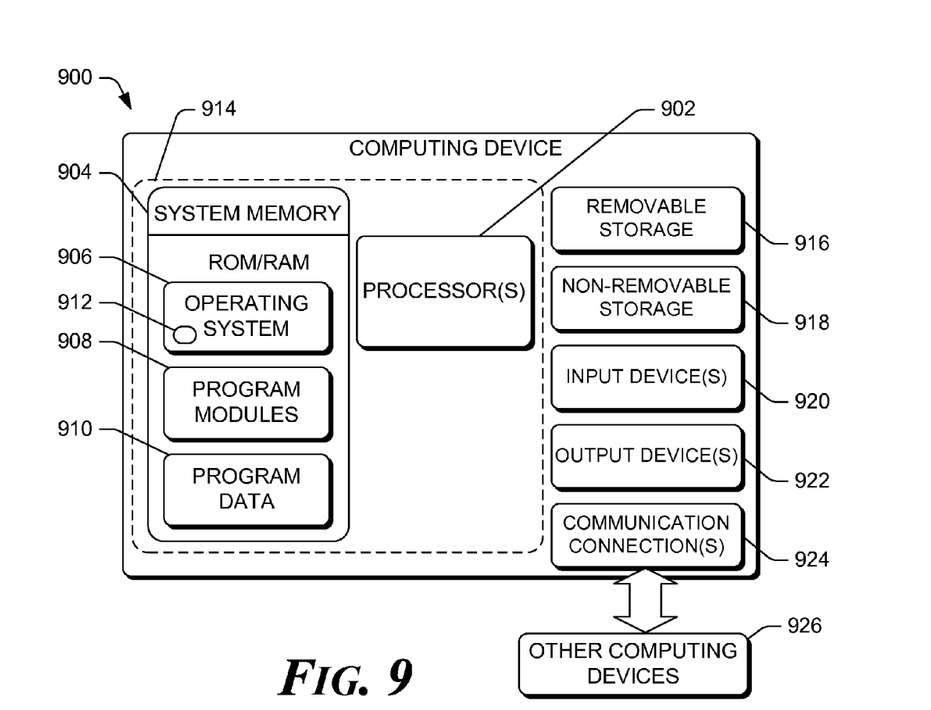
FIG. 9 is a block diagram of an illustrative computing device that may be used to implement identification of synonyms of entities using a document collection as shown in the environment of FIG. 1.

FIG. 9 is a block diagram of an illustrative computing device 900 that may be used to implement identification of synonyms of entities using a document collection as shown in the environment of FIG. 1. It will readily be appreciated that the various embodiments of synonym identification techniques and mechanisms may be implemented in other computing devices, systems, and environments. The computing device 900 shown in FIG. 9 is only one example of a computing device and is not intended to suggest any limitation as to the scope of use or functionality of the computer and network architectures.

In a very basic configuration, the computing device 900 typically includes at least one processing unit 902 and system memory 904. Depending on the exact configuration and type of computing device, the system memory 904 may be volatile (such as RAM), non-volatile (such as ROM, flash memory, etc.) or some combination of the two. The system memory 904 typically includes an operating system 906, one or more program modules 908, and may include program data 910. The operating system 906 includes a component-based framework 912 that supports components (including properties and events), objects, inheritance, polymorphism, reflection, and provides an object-oriented component-based application programming interface (API). The computing device 900 is of a very basic configuration demarcated by a dashed line 914. Again, a terminal may have fewer components but will interact with a computing device that may have such a basic configuration.

The computing device 900 may have additional features or functionality. For example, the computing device 900 may also include additional data storage devices (removable and/or non-removable) such as, for example, magnetic disks, optical disks, or tape. Such additional storage is illustrated in FIG. 9 by removable storage 916 and non-removable storage 918. Computer storage media may include volatile and non-volatile, removable and non-removable media implemented in any method or technology for storage of information, such as computer readable instructions, data structures, program modules, or other data. The system memory 904, the removable storage 916, and the non-removable storage 918 are all examples of computer storage media. The computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the computing device 900. Any such computer storage media may be part of the computing device 900. The computing device 900 may also have input device(s) 920 such as keyboard, mouse, pen, voice input device, touch input device, etc. Output device(s) 922 such as a display, speakers, printer, etc. may also be included. These devices are well known in the art and are not discussed at length here.

The computing device 900 may also contain communication connections 924 that allow the device to communicate with other computing devices 926, such as over a network. These networks may include wired networks as well as wireless networks. The communication connections 924 are one example of communication media. The communication media may typically be embodied by computer readable instructions, data structures, program modules, etc.

The illustrated computing device 900 is only one example of a suitable device and is not intended to suggest any limitation as to the scope of use or functionality of the various embodiments described herein. Other well-known computing devices, systems, environments and/or configurations that may be suitable for use with the embodiments include, but are not limited to personal computers, server computers, handheld or laptop devices, multiprocessor systems, microprocessor-base systems, set top boxes, game consoles, programmable consumer electronics, network PCs, minicomputers, mainframe computers, distributed computing environments that include any of the above systems or devices, and/or the like. For example, some or all of the components of the computing device 900 may be implemented in a data center or cloud computing environment, such that resources and/or services are made available via a computer network for selective use by client devices.

Figure 10:
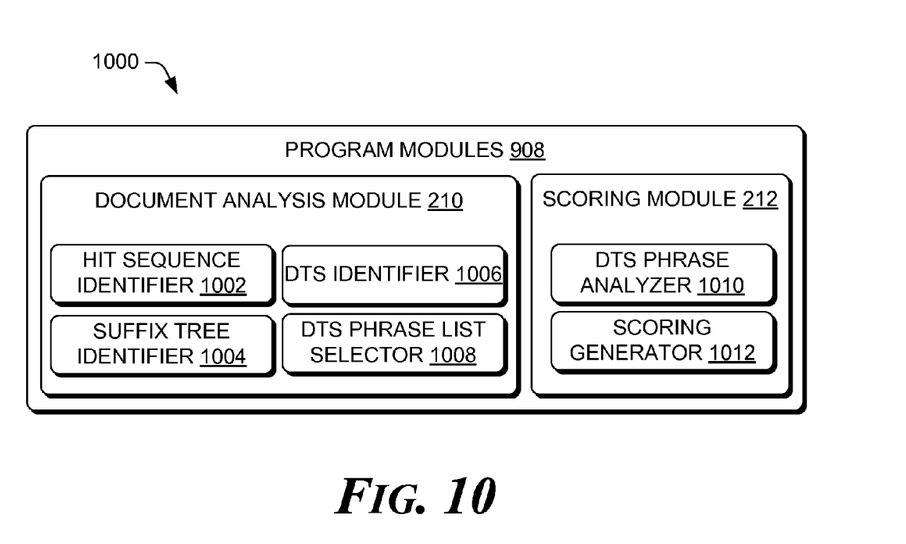
FIG. 10 is a block diagram of illustrative program modules shown in FIG. 9.

FIG. 10 is a block diagram of illustrative program modules 1000 shown in FIG. 9. The illustrative modules may be integrated with the program modules 908 as described above with the computing device 900.

In accordance with various embodiments, the document analysis module 210 may include a hit sequence identifier 1002, a suffix tree identifier 1004, and a DTS identifier 1006, and a DTS phrase list selector 1008. The hit sequence identifier 1002 may be used to extract the hit sequences 510 from the document 506 of the document collection 112. For example, the hit sequence identifier 1002 may perform some or all of the operations of the process 600 to populate the hit sequence list 508 with hit sequences 510 of the document 506.

In accordance with various embodiments, the suffix tree identifier 1004 may be used to generate and manage the suffix tree 702 and identify suffix links 708 to efficiently batch process the hit sequences.

The DTS identifier 1006 may used to identify the DTS's 120, which are sub-sequences of the hit sequences 510. In addition, the DTS identifier 1006 may map the DTS's to the entity names 104.

The DTS phrase list selector 1008 may be used to select the DTS phrases 124 for each of the DTS's 716. The phrase list selector 1008 may select the text 306 of the document 506 using the gap 308 of a predefined length.

In accordance with some embodiments, the scoring module 212 may include a DTS phrase analyzer 1010 and a score generator 1012. The DTS phrase analyzer 1010 may analyze the DTS phrases 124, which are associated with the DTS's 716 that are used to generate the DTS phrase. For example, the DTS phrase analyzer 1010 may identify the tokens 108 included in the entity name 106 in the DTS phrase 124.

The score generator 1012 may generate a score (the operation 410) for each of the DTS's 716 and/or an aggregate score for all of the DTS's (the operation 414). In the latter case, the score generator 1012 may generate a representative score for each of the DTS's 716 (e.g., an average, a median, etc.). The score generator 1012 may then compare the DTS score (the score 318) to a threshold value (e.g., via the operation 412) to determine whether the DTS is a synonym 130 or not a synonym of the entity name 106.

Conclusion

The above-described techniques may be used to identify synonyms of entities a document collection. Although the techniques have been described in language specific to structural features and/or methodological acts, it is to be understood that the appended claims are not necessarily limited to the specific features or acts described. Rather, the specific features and acts are disclosed as exemplary forms of implementing such techniques.

What is claimed is:

1. A method of efficiently selecting synonyms of an entity name, the method comprising:
   selecting a hit sequence from a document that is stored on a computing device, the hit sequence includes a contiguous string of tokens from a plurality of entity names in an entity name list;
   arranging the tokens of the hit sequence into a suffix tree as linked groups of tokens of the hit sequence, wherein the suffix tree contains a suffix link identifier to
   (i) identify a discriminating token set (DTS) that is a sub-sequence of the hit sequence,
   (ii) manage and generate the suffix tree, and
   (iii) efficiently batch process the hit sequences;
   generating a combination token index from the entity name list identifying a position of each of the tokens and indexes for one or more combinations of each of the tokens;
   determining a discriminating token set map from the combination token index and the suffix tree, the DTS map including a matching of the entity name and the DTS;
   storing a portion of adjacent text surrounding the DTS from the document as a DTS phrase;
   identifying token pairs that are common between the entity name and the DTS phrase associated with the entity name, the token pairs being tokens that are a subset of both the entity name and the DTS phrase;
   generating a score for the DTS based on an occurrence of the token pairs in the DTS phrase,
   wherein the score is an aggregate score for the DTS across a document collection and the score is generated by counting unique instances of the token pairs and assigning a numerical value to the DTS based on a count of the unique instances of the identified tokens; and
   storing the DTS as a synonym of the entity name on the computing device when the generated score at least reaches the threshold value.

2. The method as recited in claim 1, further comprising using the synonyms in a synonym list to retrieve documents associated with the entity name.

3. The method as recited in claim 1, wherein the hit sequences are generated using a token table that contains at least one of unique tokens sets or core token sets.

4. The method as recited in claim 1, further comprising utilizing a map-reduce framework to enable processing of a large collection of documents.

5. The method as recited in claim 4, further comprising:
   generating a suffix tree of the hit sequence to map unique token combinations of the hit sequence as the DTS to the entity name; and
   exploiting suffix links in the suffix tree to identify the DTS.

6. A computer-readable memory storing computer-executable instructions that, when executed, cause one or more processors to perform acts comprising:
   selecting a hit sequence from a document that includes a contiguous string of tokens from an entity name, the entity name being a label assigned to an entity by a producer of the entity or an authority on the entity;
   generating a suffix tree of the hit sequence to map unique token combinations of the hit sequence as a discriminating token set (DTS) to the entity name;
   exploiting suffix links in the suffix tree to identify the DTS, the suffix link used to efficiently batch process the hit sequences;

selecting the DTS from the hit sequence, the DTS including tokens from the entity name that is associated with the DTS;

storing a portion of adjacent text surrounding the DTS from the document as a DTS phrase;

identifying token pairs that are common between the entity name and the DTS phrase associated with the entity name, the token pairs being tokens in the adjacent text surrounding the DTS that are a subset of both the entity name and the DTS phrase;

generating a score for the DTS based on an occurrence of the token pairs in the DTS phrase, wherein the score is an aggregate score for the DTS across a document collection and the score is generated by counting unique instances of the token pairs and assigning a numerical value to the DTS based on a count of the unique instances of the identified tokens; and storing the DTS as a synonym of the entity name when the generated score at least reaches the threshold value.

7. The computer-readable memory of claim 6, further comprising using the synonyms in a synonym list to retrieve documents associated with the entity name.

8. The computer-readable memory of claim 6, wherein the hit sequence is selected from a plurality of entity names in an entity name list, and wherein the hit sequences are generated using a token table that contains at least one of unique tokens sets or core token sets.

9. The computer-readable memory of claim 6, further comprising utilizing a map-reduce framework to enable processing of a large collection of documents.

10. A method of selecting synonyms of an entity name, the method comprising:

selecting a hit sequence from a document that is stored on a computing device, the hit sequence including tokens from an entity name and are generated using a token table that contains at least one of unique tokens sets or core token sets;

generating a suffix tree of the hit sequence to map unique token combinations of the hit sequence as a discriminating token set (DTS) to the entity name;

exploiting suffix links in the suffix tree to identify the DTS, the suffix link used to efficiently batch process the hit sequences;

selecting the DTS from the hit sequence, the DTS including tokens from the entity name that is associated with the DTS;

storing a portion of adjacent text surrounding the DTS from the document as a DTS phrase;

identifying token pairs that are common between the entity name and the DTS phrase associated with the entity name, the token pairs being tokens that are a subset of both the entity name and the DTS phrase;

generating a score for the DTS based on an occurrence of the token pairs in the DTS phrase, the score being based on a percentage of tokens in the DTS phrase that match one or more tokens from the entity name;

storing the DTS as a synonym of the entity name on the computing device when the generated score at least reaches the threshold value; and utilizing a map-reduce framework to enable processing of a large collection of documents.

11. The method as recited in claim 10, further comprising using the synonyms in a synonym list to retrieve documents associated with the entity name.

12. The method as recited in claim 10, wherein the score is an aggregate score for the DTS across a document collection, and wherein the generating the score includes counting unique instances of the token pairs and assigning a numerical value to the DTS based on a count of the unique instances of the identified tokens.

13. The method as recited in claim 10, wherein the hit sequence includes a contiguous string of tokens that are selected from a plurality of entity names in an entity name list.

* * * * *